United States Patent
Hartmann et al.

(10) Patent No.: US 10,211,693 B2
(45) Date of Patent: Feb. 19, 2019

(54) MOUNTING OF PERMANENT MAGNETS ON A ROTOR OF AN ELECTRIC MACHINE

(71) Applicant: SIEMENS AKTIENGESELLSCHAFT, München (DE)

(72) Inventors: Ulrich Hartmann, Berlin (DE); Martin Junge, Grafenau (DE); Friederike Richter, Berlin (DE); Robert Schwengber-Walter, Lübben (DE); Bernhard Urlhart, Passau (DE); Georg Walberer, Kastl (DE); Michael Weidemann, Berlin (DE)

(73) Assignee: Siemens Aktiengesellschaft, München (DE)

( * ) Notice: Subject to any disclaimer, the term of this patent is extended or adjusted under 35 U.S.C. 154(b) by 304 days.

(21) Appl. No.: 15/302,864

(22) PCT Filed: Mar. 27, 2015

(86) PCT No.: PCT/EP2015/056708
§ 371 (c)(1),
(2) Date: Oct. 7, 2016

(87) PCT Pub. No.: WO2015/155032
PCT Pub. Date: Oct. 15, 2015

(65) Prior Publication Data
US 2017/0033626 A1 Feb. 2, 2017

(30) Foreign Application Priority Data

Apr. 11, 2014 (EP) .................................... 14164398

(51) Int. Cl.
*H02K 1/27* (2006.01)
*H02K 1/28* (2006.01)
(Continued)

(52) U.S. Cl.
CPC ............... *H02K 1/28* (2013.01); *H02K 1/278* (2013.01); *H02K 15/03* (2013.01); *H02K 15/12* (2013.01)

(58) Field of Classification Search
CPC .......... H02K 1/28; H02K 1/278; H02K 15/03; H02K 15/12
(Continued)

(56) References Cited

U.S. PATENT DOCUMENTS 6,891,295 B2 * 5/2005 Naritomi ................ H02K 1/278
310/153
7,116,026 B2 * 10/2006 Kuwabara .............. H02K 1/278
310/156.21
(Continued)

FOREIGN PATENT DOCUMENTS

AT 184978 B 3/1956
CN 101272027 A 9/2008
(Continued)

*Primary Examiner* — Jeremy A Luks
(74) *Attorney, Agent, or Firm* — Henry M. Feiereisen LLC

(57) ABSTRACT

A rotor for an electric machine has a surface with projections. Each projection protrudes from the rotor in an essentially axial direction and is configured to define a groove between the projection and the surface. The groove of one projection of two adjacent projections and the groove of the other one projection of the two adjacent projections is open towards a region between the adjacent two projections. A cover engages in the grooves of the adjacent two projections, and a sealing compound is applied in the form of a fillet seam between the cover and the adjacent two projections. Received in an intermediate space between the cover and the surface is a permanent magnet, and a pouring compound is received in a remaining hollow space defined between the permanent magnet and the cover and/or the permanent magnet and the surface.

20 Claims, 1 Drawing Sheet

(51) Int. Cl.
*H02K 15/03* (2006.01)
*H02K 15/12* (2006.01)

(58) Field of Classification Search
USPC ............ 310/156.12, 156.14, 156.21, 156.23, 310/156.28, 156.31
See application file for complete search history.

(56) References Cited

U.S. PATENT DOCUMENTS

| | | | | |
|---|---|---|---|---|
| 7,642,691 | B2* | 1/2010 | Morita | H02K 21/044 310/156.72 |
| 7,836,575 | B2* | 11/2010 | Groendahl | H01F 7/0221 264/272.15 |
| 8,629,596 | B2 | 1/2014 | Germishuizen et al. | |
| 8,847,453 | B2* | 9/2014 | Bayer | H01F 7/0221 310/154.07 |
| 9,112,393 | B2* | 8/2015 | Jayasoma | H02K 1/278 |
| 9,197,116 | B2 | 11/2015 | Junge et al. | |
| 9,343,936 | B2 | 5/2016 | Hartmann et al. | |
| 9,490,672 | B2* | 11/2016 | Airoldi | H02K 1/278 |
| 9,515,529 | B2* | 12/2016 | Lynch | H02K 1/28 |
| 2010/0194226 | A1* | 8/2010 | Metzner | H02K 1/278 310/156.21 |
| 2011/0043065 | A1* | 2/2011 | Piercey | H02K 1/278 310/156.12 |
| 2011/0140561 | A1 | 6/2011 | Clark et al. | |
| 2012/0187793 | A1* | 7/2012 | Hartmann | H02K 1/278 310/156.28 |
| 2012/0299434 | A1 | 11/2012 | Hartmann et al. | |
| 2013/0214620 | A1 | 8/2013 | Kobayashi et al. | |
| 2014/0028138 | A1 | 1/2014 | Feher et al. | |
| 2014/0077651 | A1 | 3/2014 | Stiesdal | |
| 2015/0091404 | A1* | 4/2015 | Funakoshi | H02K 1/278 310/156.21 |
| 2015/0188370 | A1* | 7/2015 | Stiesdal | H02K 1/278 310/156.21 |
| 2016/0322873 | A1* | 11/2016 | Udo | H02K 1/28 |
| 2017/0117765 | A1* | 4/2017 | Nishifukumoto | H02K 1/278 |

FOREIGN PATENT DOCUMENTS

| | | |
|---|---|---|
| DE | 20009149 U1 | 9/2000 |
| EP | 1860755 A2 | 11/2007 |
| EP | 1990811 A1 | 11/2008 |
| EP | 2410633 A1 | 1/2012 |
| EP | 2555383 A1 | 2/2013 |
| FR | 2673776 A3 | 9/1992 |
| WO | WO 2011107168 A1 | 9/2011 |

* cited by examiner

MOUNTING OF PERMANENT MAGNETS ON A ROTOR OF AN ELECTRIC MACHINE

CROSS-REFERENCES TO RELATED APPLICATIONS

This application is the U.S. National Stage of International Application No. PCT/EP2015/056708, filed Mar. 27, 2015, which designated the United States and has been published as International Publication No. WO 2015/155032 which claims the priority of European Patent Application, Serial No. 14164398.1, filed Apr. 11, 2014, pursuant to 35 U.S.C. 119(a)-(d).

BACKGROUND OF THE INVENTION

The invention relates to a permanent-field rotor of an electric machine, an electric machine comprising such a rotor, and a method for mounting at least one permanent magnet on a surface of a rotor of an electric machine.

Such a rotor or method is used respectively in permanent-field wind power generators or the production thereof, for example. In the case of such large-scale electric machines, it is usually necessary to mount and attach multiple magnetized magnets to the rotor of the machine, since subsequent magnetization is not possible. Owing to their high susceptibility to corrosion, the magnets must be protected against environmental conditions such as humidity and aggressive mediums, for example. These requirements are incompatible with cost-effective economical manufacture, particularly in the case of high unit volumes.

The attachment of the magnets was previously achieved by adhesive fixing of the individual magnets, for example, using an additional bandage as a means of securing and protecting the magnets against environmental influences, particularly in the case of internal rotors. It is also customary to adhesively fix or encapsulate the individual magnets in shells, said shells being mounted on carrier plates and the carrier plates attached to the rotor. A plurality of carrier plates per pole are arranged one behind the other in an axial direction. In the case of smaller machines, mounting is customarily effected using pockets into which the magnets are inserted and fixed by adhesion. It is also customary to use magnet covers which are welded onto the rotor base plate, the magnets being then inserted and encapsulated.

EP2410633A1 discloses a rotor arrangement with permanent magnets, said arrangement comprising a rotor, a plurality of non-magnetic profiled tubes and a plurality of permanent magnets. Each of the tubes defines a closed channel in this case, and is attached to the circumference of an outer side of the rotor, the permanent magnets being arranged in the tubes.

AT184978B discloses a magnet wheel for synchronous machines, wherein each permanent magnet pole is equipped with a pole shoe which is supported via adapters against correspondingly shaped poles that are not made of permanently magnetic material, whereby only compressive stresses can occur in the material of the permanent magnetic poles under the effect of centrifugal force.

EP 2 555 383 A1 discloses a permanent magnet arrangement in which permanent magnets are fixed to a rotor by means of a cover, wherein the cover is fixed by means of T-shaped projections which are enclosed by the rotor yoke.

EP 1 990 811 A1 discloses a method and an arrangement for protecting permanent magnets, wherein the permanent magnets and a protective cover are fixed by adhesion to a base plate.

WO 2011/107168 A1 discloses a method for attaching a magnet to a rotor, wherein the magnet is arranged on the surface of the rotor, wherein a pair of retaining elements are arranged on either side of the magnet and the arrangement is evacuated, and wherein an adhesive is used to attach the magnets and the retaining elements to the rotor surface.

SUMMARY OF THE INVENTION

The object of the invention is to provide a comparatively long-lasting permanent-field rotor and a method for the production thereof.

This object is achieved by a rotor of the type cited in the introduction, wherein said rotor has a surface comprising projections which protrude from the rotor and run in an essentially axial direction,
wherein each projection is embodied in such a way that at least one groove is formed between the respective projection and the surface, and
wherein at least two adjacent projections are embodied in such a way that the at least one groove of each projection is open towards the region between the two adjacent projections,
a respective cover, which is so arranged as to engage in the respective at least one groove of two adjacent projections,
a sealing compound, which is applied in the form of a fillet seam between on one side the respective cover and on the other side the respective projection,
at least one permanent magnet, which is introduced into an intermediate space between the respective cover and the surface in each case, and
a pouring compound, which is introduced into the remaining hollow space between on one side the respective permanent magnet that has been introduced into the intermediate space and on the other side the respective cover and/or the surface.

The object is further achieved by an electric machine comprising such a rotor.

Lastly, the object is achieved by a method for mounting at least one permanent magnet on a surface of a rotor of an electric machine, comprising steps as follows:

embodying projections which protrude from the rotor and run in an essentially axial direction,
wherein each projection is embodied in such a way that at least one groove is formed between the respective projection and the surface, and
wherein at least two adjacent projections are embodied in such a way that the at least one groove of each projection is open towards the region between the two adjacent projections,
arranging a respective cover in such a way that it engages in the respective at least one groove of two adjacent projections,
applying sealing compound in the form of a fillet seam between on one side the respective cover and on the other side the respective projection,
introducing at least one permanent magnet into an intermediate space between the respective cover and the surface, and
introducing pouring compound into the remaining hollow space between on one side the respective permanent magnet that has been introduced into the intermediate space and on the other side the respective cover and/or the surface.

For the purpose of seating the magnets, e.g. flat surfaces are provided on the base material of the curved rotor housing, preferably by means of milling. The introduction of the grooves into the curved rotor housing can take place as part of the milling of the flat seating surfaces for the magnets, and therefore has almost no effect on costs. The projections are developed in the pole gaps, i.e. in the surfaces between the individual magnetic pole rows. The resulting grooves are used to hold the covers, these being embodied as pre-curved plates, for example. The covers are preferably open at only one axial end, in order to allow subsequent insertion of the magnets.

Once the covers have been mounted, a sealing compound can be provided all around the interfaces between the respective cover and the rotor housing. The sealing compound is applied locally in the form of a so-called fillet seam. Following the insertion of the magnets, in particular through the open end, the hollow space between the magnets, the respective cover and the rotor housing is filled by means of a pouring compound. The sealing compound in the outer region prevents the escape of the comparatively thin-bodied pouring compound in this case. In particular, the sealing compound has the task of impeding any escape of the pouring compound before it has cured. The pouring compound can be an epoxy resin, for example.

In particular, the sealing compound is not electrically conductive, not solderable and/or not weldable. In order to ensure that it is particularly easy to process the sealing compound at the time of its introduction, the sealing compound has an elastic modulus of less than 10 kN/mm$^2$, in particular less than 1 kN/mm$^2$ under normal conditions. Alternatively or additionally, at the time of its introduction, the sealing compound has a viscosity of less than $3\times10^6$ mPas, in particular a viscosity in the range between $10^4$ mPas and $5\times10^5$ mPas under normal conditions. The sealing compound and the pouring compound are preferably selected such that the pouring compound is thinner-bodied than the sealing compound by at least one order of magnitude. In particular, the sealing compound in its dried or cured state, or during the introduction of the pouring compound, is thicker-bodied than the pouring compound by at least one order of magnitude during the introduction of the pouring compound.

In particular, good results can be achieved if the sealing compound has already been applied, the at least one permanent magnet has already been introduced, and the remaining hollow space has already been at least partially evacuated before the pouring compound is introduced.

Each cover is preferably introduced into the respective grooves of two adjacent projections in such a way that the respective cover is fixed in a radial direction and in a circumferential direction by positive engagement, at least by virtue of the two adjacent projections. Each cover can also be braced against the respective projections. In addition, a suitable e.g. reusable device can be employed in the case of batch mounting, wherein said device includes e.g. a bead of flexible material for the purpose of sealing. In this way, the sealing compound can easily be introduced and held in the gap between the respective cover on one side and the respective projection on the other side.

The sealing compound is applied in the form of a fillet seam. The respective fillet seam can be applied to e.g. the outer and/or inner side of the respective cover on one side and to the respective projection on the other side, such that the gap between the respective cover on one side and the respective projection is sealed externally and/or internally.

The respective fillet seam can have various edges in this case, and may be configured as a miter fillet seam, a convex fillet seam or a concave fillet seam, for example. In particular, if a respective fillet seam is provided on both the inner side and the outer side, the respective fillet seam can be configured as a double fillet seam.

In comparison with known solutions in which covers are welded on, it is advantageously possible to dispense with weld seams between the respective cover and the rotor housing. This reduces the number of manufacturing steps and increases process reliability since the welding of the covers, which are very thin relative to the rotor housing, is very demanding.

Moreover, the proposed rotor and/or method allows the number of possible suppliers to be increased, since a lengthy trialing process is required for the connection between cover plates, these being made of thin special steel in particular, and the solid rotor housing. The corrosion protection of the previously blank grooves, from the supplier until insertion of the covers and/or magnets, is also improved. Since the blank surfaces are not required for the purpose of welding, priming can be applied to the whole component. In particular, this protects the grooves of the magnets against corrosion.

By virtue of the sealing compound, it is possible reliably to prevent any unwanted escape of the pouring compound from the hollow space between the respective permanent magnet and the respective cover and/or the surface. In particular, this ensures that the pouring compound which is introduced into the hollow space fills the hollow space to a sufficient extent and remains in the hollow space until it has cured. This prevents to a significant extent any premature corrosion of the respective permanent magnet, since the respective permanent magnet is shielded against air, humidity and dirt by the pouring compound.

The proposed electric machine comprising such a rotor may be configured as a wind power generator, for example, the rotor being embodied as an external or internal rotor. Particularly in the harsh environmental conditions of wind power generators that are installed at sea, it is therefore possible crucially to extend the service life of the rotor by virtue of the proposed measures. If the proposed electric machine is configured as a mill drive, for example, these measures likewise extend the service life of the rotor despite the adverse environmental influences that are present in a mill.

In an advantageous embodiment of the invention, at least one of the projections is so embodied as to be essentially L-shaped.

Such a projection has a rib which protrudes in a radial direction from the rotor, a type of flange being arranged at the end of the rib, said flange being so oriented as to be essentially parallel to the remaining surface of the rotor and extending from the rib in one direction only when viewed circumferentially. The previously explained groove remains between the flange and the body of the rotor in this case, wherein the cover is introduced into said groove for the attachment thereof, preferably by positive engagement.

In a further advantageous embodiment of the invention, at least one of the projections is so embodied as to be essentially T-shaped.

Such a projection has a rib which protrudes in a radial direction from the rotor, a type of flange being arranged at the end of the rib, said flange being so oriented as to be essentially parallel to the remaining surface of the rotor and extending circumferentially from the rib in both directions. Therefore two of the previously explained grooves remain between the flange and the body of the rotor. One end of a respective cover is introduced into each of the two grooves for the attachment thereof, preferably by positive engagement.

In a further advantageous embodiment of the invention, the sealing compound comprises a paint.

Paint is comparatively easy to process and reliably closes the remaining gaps between the respective cover on one side and the respective projection on the other side. It can thus be ensured that any adverse escape of pouring compound from the previously described intermediate space does not occur through the holes. Depending on the material properties of the paint, the pouring compound is preferably introduced only after the paint has dried and/or cured sufficiently.

In a further advantageous embodiment of the invention, the sealing compound comprises a synthetic material, in particular silicone.

Synthetic materials, in particular silicone, are particularly easy to process and already allow the pouring compound to be introduced into the remaining hollow space immediately after the application of the sealing compound. The synthetic material or the silicone is preferably so selected as to have a viscosity or elastic modulus which allows the synthetic material or the silicone to be applied to the previously described gap in particular, thereby sealing the gap reliably and completely. In particular, the synthetic material or the silicone also has a viscosity which allows the pouring compound to be introduced into the remaining hollow space immediately after the application of the sealing compound, without it being possible for the pouring compound to escape through the gap which has been filled by the sealing compound. This can be achieved if the sealing compound during processing is already thicker-bodied than the pouring compound by at least one order of magnitude, for example.

In a further advantageous embodiment of the invention, the pouring compound completely surrounds the at least one permanent magnet.

As a result of the respective permanent magnet being completely surrounded by the pouring compound, it is ensured that no air, humidity or other dirt comes into contact with the respective permanent magnet. This prevents premature corrosion of the permanent magnet, whereby the rotor as a whole becomes particularly long-lasting.

In particular, it is possible completely to surround the respective permanent magnet by completely filling the respective hollow space explained above with the pouring compound. To this end, the remaining hollow space can be evacuated and/or the pouring compound introduced into the hollow space at a certain pressure, the sealing compound preferably being so selected as to ensure an adequate seal. In particular, the sealing compound is thicker-bodied than the pouring compound by at least two orders of magnitude at the instant the pouring compound is introduced.

In a further advantageous embodiment of the invention, the respective cover extends essentially in an axial direction and has an essentially U-shaped cross section.

The respective permanent magnet is so embodied as to be essentially cuboid, for example, the respective cover being correspondingly embodied in order effectively to enclose that side of the respective permanent magnet which faces away from the surface. A retention force which is as evenly distributed as possible can thereby be exerted on the respective permanent magnet.

In a further advantageous embodiment of the invention, the rotor is embodied as an internal rotor.

The respective cover is attached to the radial outer housing surface of the rotor accordingly. In the case of comparatively fast running machines and/or machines having a large diameter of several meters in particular, the proposed rotor ensures secure attachment of the respective permanent magnet. In particular, unwanted vibrations of the respective permanent magnet relative to the respective cover or the surface are thereby suppressed, whereby the service life of the rotor is again extended.

The invention is described and explained in greater detail below with reference to the exemplary embodiments illustrated in the figures, in which:

DETAILED DESCRIPTION OF PREFERRED EMBODIMENTS

Figure 1:
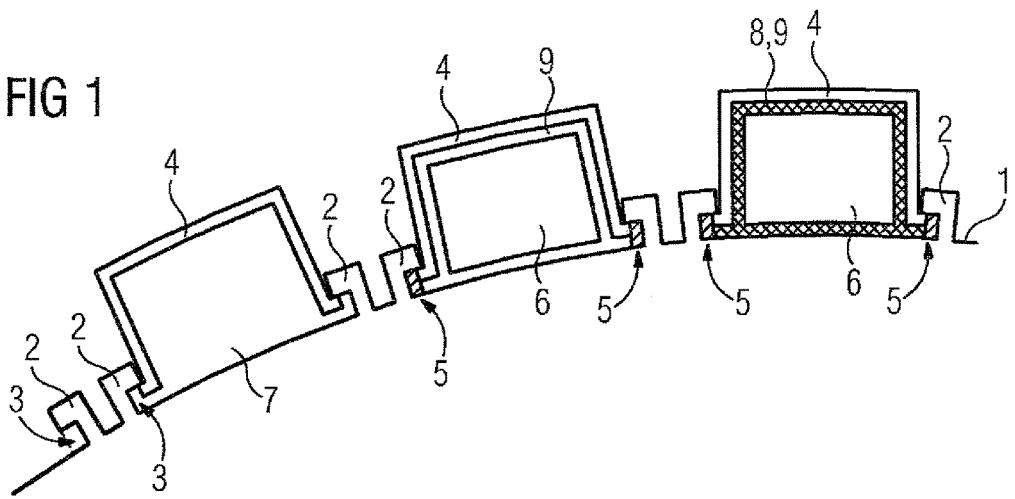
FIG. 1 shows a first exemplary embodiment of the rotor according to the invention.

FIG. 1 shows a first exemplary embodiment of the rotor according to the invention. Illustrated in this case is an extract of a cross section perpendicular to a rotational axis of the rotor, said rotor being embodied as an internal rotor in the context of this exemplary embodiment. In order to ensure clarity and to allow method steps of the inventive method to be illustrated, some details have been omitted in the illustration of the rotor.

The rotor has a surface 1 comprising projections 2 which protrude from the rotor. The projections 2 run essentially in an axial direction and are L-shaped in the context of the exemplary embodiment, such that a groove 3 is formed between the respective projection 2 and the surface 1. The projections 2 are embodied in pairs, in such a way that the respective groove 3 is open towards the region between the two adjacent projections 2. A respective cover 4 is so arranged in this respective region that the respective cover 4 engages in the respective grooves 3 of the two adjacent projections 2. One end of the respective cover 4 engages in a respective groove 3 in each case, such that the respective cover 4 is fixed by positive engagement in a radial direction and in a circumferential direction by virtue of the two adjacent projections 2.

An intermediate space 7, into which at least one permanent magnet 6 is introduced in each case, remains between the respective cover 4 and the surface 1 in this way. A hollow space 9 remains between the respective permanent magnet 6 on one side and the respective cover 4 and/or the surface 1 on the other side. The rotor has a sealing compound 5, which is applied between the respective cover 4 on one side and the respective projection 2 and/or the surface 1 in the region of the respective projection 2 on the other side. The sealing compound 5 may comprise a paint or a synthetic material, in particular silicone, for example.

The sealing compound 5 is preferably applied in the form of a fillet seam. The respective subject is applied on one side to the respective cover 4 and on the other side to both the respective projection 2 and the surface 1 in the region of the respective projection 2, thereby sealing the gap between on one side the respective cover 4 and on the other side the respective projection 2 and the surface 1 in the region of the respective projection 2.

The respective fillet seam can have various edges in this case, and may therefore be embodied as a miter fillet seam, a convex fillet seam or a concave fillet seam, for example.

The rotor also comprises a pouring compound 8, which is introduced into the remaining respective hollow space 9 around the respective permanent magnet 6 and preferably fills the hollow space 9 completely.

Figure 2:
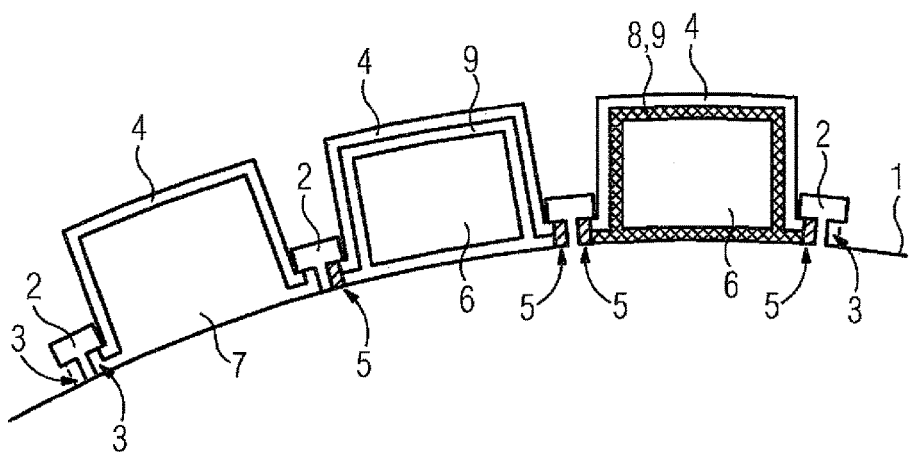
FIG. 2 shows a second exemplary embodiment of the rotor according to the invention.

FIG. 2 shows a second exemplary embodiment of the rotor according to the invention. Reference signs identical to those in FIG. 1 denote the same subject matter in this case.

Differing from the first exemplary embodiment, the projections 2 according to the second exemplary embodiment are T-shaped. The respective projection 2 therefore has two grooves 3, one groove 3 being open in one direction circumferentially and the other groove 3 being open in the other direction.

Figure 3:
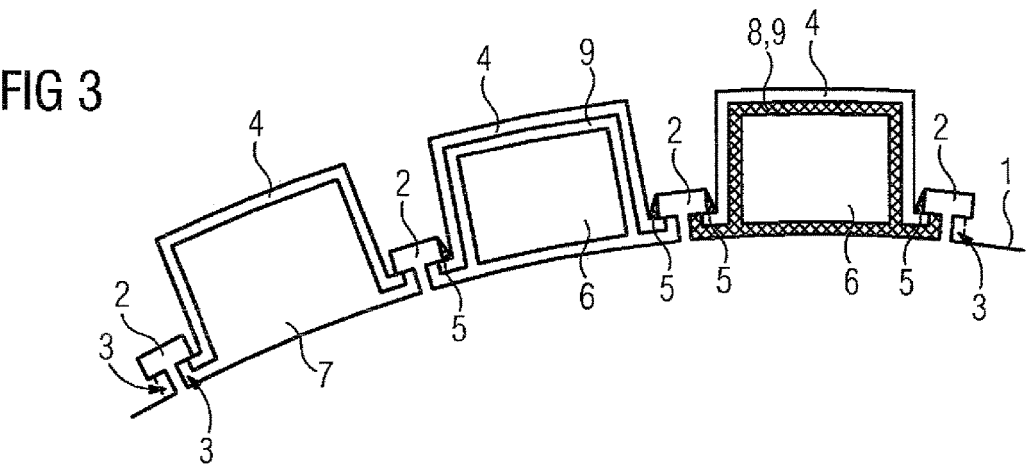
FIG. 3 shows a third exemplary embodiment of the rotor according to the invention.

FIG. 3 shows a third exemplary embodiment of the rotor according to the invention.

According to the third exemplary embodiment, the sealing compound 5 is applied in the form of a fillet seam, which is applied to the outer side of the respective cover 4 in the vicinity of the respective projection 2, such that the gap between the respective cover 4 on one side and the respective projection 2 is sealed externally.

In this case, the projections can be T-shaped as per the second and third exemplary embodiments or L-shaped as per the first exemplary embodiment.

In summary, the invention relates to a permanent-field rotor of an electric machine, an electric machine comprising such a rotor, and a method for mounting at least one permanent magnet on a surface of a rotor of an electric machine. In order to provide a comparatively long-lasting permanent-field rotor and/or a method for the production thereof, it is proposed that the rotor should have
- a surface comprising projections which protrude from the rotor and run in an essentially axial direction,
- wherein each projection is embodied in such a way that at least one groove is formed between the respective projection and the surface, and
- wherein at least two adjacent projections are embodied in such a way that the at least one groove of each projection is open towards the region between the two adjacent projections,
- a respective cover, which is so arranged as to engage in the respective at least one groove of two adjacent projections,
- a sealing compound, which is applied in the form of a fillet seam between on one side the respective cover and on the other side the respective projection,
- at least one permanent magnet, which is introduced into an intermediate space between the respective cover and the surface in each case, and
- a pouring compound, which is introduced into the remaining hollow space between on one side the respective permanent magnet that has been introduced into the intermediate space and on the other side the respective cover and/or the surface.

Also proposed is an electric machine comprising such a rotor. In order to achieve the object of the invention, a method is also proposed for mounting at least one permanent magnet on a surface of a rotor of an electric machine, said method comprising the following steps:
- embodying projections which protrude from the rotor and run in an essentially axial direction,
- wherein each projection is embodied in such a way that at least one groove is formed between the respective projection and the surface, and
- wherein at least two adjacent projections are embodied in such a way that the at least one groove of each projection is open towards the region between the two adjacent projections,
- arranging a respective cover in such a way that it engages in the respective at least one groove of two adjacent projections,
- applying sealing compound in the form of a fillet seam between on one side the respective cover and on the other side the respective projection and/or the surface in the region of the respective projection,
- introducing at least one permanent magnet into an intermediate space between the respective cover and the surface, and
- introducing pouring compound into the remaining hollow space between on one side the respective permanent magnet that has been introduced into the intermediate space and on the other side the respective cover and/or the surface.

The invention claimed is:

1. A rotor for an electric machine, comprising:
a surface having projections, each projection protruding from the rotor in an essentially axial direction and configured so as to define a groove between the projection and the surface, with the groove of one projection of two adjacent projections and the groove of the other projection of the two adjacent projections being open towards a region between the adjacent two projections;
a cover engaging in the grooves of the adjacent two projections;
a sealing compound applied in the form of a fillet seam between the cover and the adjacent two projections;
a permanent magnet received in an intermediate space between the cover and the surface; and
a pouring compound received in a remaining hollow space defined between the permanent magnet and the cover and/or the permanent magnet and the surface.

2. The rotor of claim 1, wherein at least one of the projections is essentially L-shaped.

3. The rotor of claim 1, wherein at least one of the projections is essentially T-shaped.

4. The rotor of claim 1, wherein the sealing compound comprises a paint.

5. The rotor of claim 1, wherein the sealing compound comprises a synthetic material.

6. The rotor of claim 5, wherein the synthetic material is silicone.

7. The rotor of claim 1, wherein the pouring compound completely surrounds the permanent magnet.

8. The rotor of claim 1, wherein the cover extends in the essentially axial direction and has an essentially U-shaped cross section.

9. The rotor of claim 1, constructed in the form of an internal rotor.

10. An electric machine, comprising a rotor, said rotor comprising a surface having projections, each projection protruding from the rotor in an essentially axial direction and configured so as to define a groove between the projection and the surface, with the groove of one projection of two adjacent projections and the groove of the other projection of the two adjacent projections being open towards a region between the adjacent two projections, a cover engaging in the grooves of the adjacent two projections, a sealing compound applied in the form of a fillet seam between the cover and the adjacent two projections, a permanent magnet received in an intermediate space between the cover and the surface, and a pouring compound received in a remaining hollow space defined between the permanent magnet and the cover and/or the permanent magnet and the surface.

11. The electric machine of claim 10, wherein at least one of the projections is essentially L-shaped.

12. The electric machine of claim 10, wherein at least one of the projections is essentially T-shaped.

13. The electric machine of claim 10, wherein the sealing compound comprises a paint.

14. The electric machine of claim 10, wherein the sealing compound comprises a synthetic material.

15. The electric machine of claim 14, wherein the synthetic material is silicone.

16. The electric machine of claim 10, wherein the pouring compound completely surrounds the permanent magnet.

17. The electric machine of claim 10, wherein the cover extends in the essentially axial direction and has an essentially U-shaped cross section.

18. The electric machine of claim 10, wherein the rotor is constructed in the form of an internal rotor.

19. A method for mounting a permanent magnet on a surface of a rotor for an electric machine, said method comprising:
    forming projections to protrude from the surface of the rotor in an essentially axial direction such as to define a groove between each of the projections and the surface so that the groove of one projection of two adjacent projections and the groove of the other projection of the two adjacent projections are open towards a region between the adjacent two projections;
    engaging a cover in the grooves of the adjacent two projections;
    applying a sealing compound in the form of a fillet seam between the cover and the adjacent two projections;
    placing the permanent magnet into an intermediate space between the cover and the surface; and
    introducing a pouring compound into a remaining hollow defined between the permanent magnet and the cover and/or the permanent magnet and the surface.

20. The method of claim 19, wherein the pouring compound completely surrounds the permanent magnet.

* * * * *